United States Patent Office 2,918,607
Patented Dec. 22, 1959

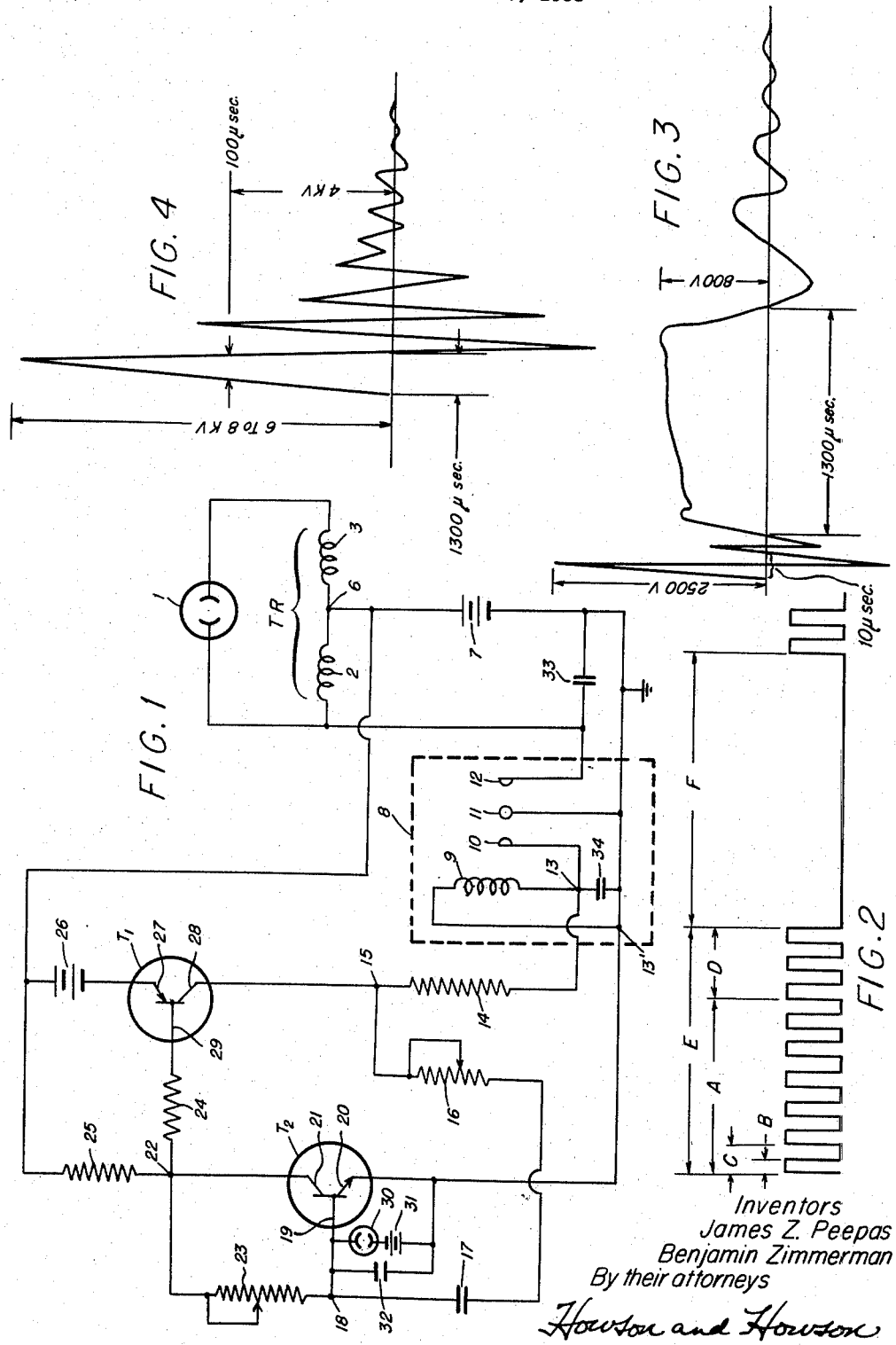

2,918,607
FLASHER CONTROL CIRCUIT

James Z. Peepas, East Orange, N.J., and Benjamin Zimmerman, Brooklyn, N.Y.; said Peepas assignor to Selecto-Flash, Inc., East Orange, N.J., a corporation of New Jersey Application October 7, 1958, Serial No. 765,868

14 Claims. (Cl. 315—163)

This invention relates to an automatic light flasher warning device and more particularly to a portable battery operated automatic control circuit which provides control of the flasher sequence and duty cycle, and automatically controls the on and off periods of the light according to the amount of daylight present. Even more particularly, it relates to an automatic light flasher circuit which provides high levels of light intensity output with minimum power requirements. The invention is especially adapted for use as a warning device but is not necessarily limited thereto as it has wide application as a marker, signal device, etc. Existing flasher warning devices have several inherent limitations. Portable light flashers fall into two categories. Those using gas filled lamps and those using incandescent lamps.

A. *Limitations of existing flashers using incandescent lamps*

(1) To obtain appreciable light output, large amounts of power are required, thereby limiting the battery life used to energize the light.

(2) The life expectancy of incandescent lamps operating continuously at a high flasher repetition rate can be measured in months as compared to gas filled lamps used in the same operation whose life expectancy is measured in years.

(3) Incandescent flasher circuits presently in use, have no provisions for automatically cutting off the flasher during daylight hours.

(4) During the off periods (when the flash does not appear) the standby power consumption of the control circuit is relatively high. Even when the lamp is off, the circuit consumes power.

B. *Limitations of existing flashers using gas filled lamps*

(1) The flash time or duty cycle is short, thereby limiting the visible light output.

(2) The length of the flash time or duty cycle cannot be controlled to provide a satisfactory level of light output.

(3) The repetition rate of the flash cannot be easily controlled.

Accordingly, one object of this invention is to provide a high voltage, portable, battery operated, automatic flasher system and apparatus.

Another object of this invention is to provide a portable flasher device whose flasher frequency is controllable.

Another object is to provide a portable flasher device whose flasher duty cycle is controllable.

Another object is to provide an automatic control circuit which is usable for either gas filled or incandescent lamp circuits.

Another object is to provide a flasher control circuit which requires a minimum of power for operation.

Another object is to provide a flasher control circuit which automatically goes off with daylight and automatically comes on with nightfall, thereby utilizing minimum amounts of power and providing a rest period for the batteries. The period when the light automatically comes on or goes off is adjustable.

A further object of this invention is to provide a high voltage flasher control circuit which requires only a 6 or 12 volt battery supply to provide a maximum intensity light.

For purposes of description of the present invention, the flasher duty cycle is defined as that portion of time of one light cycle that the light is on, divided by the total time of the light cycle. The flasher frequency is defined as the reciprocal of the time of a light cycle.

In the accompanying drawing, Fig. 1 is a circuit diagram of the control circuit which controls a gas filled lamp. Fig. 2 is an example of a typical wave form of the pulses delivered by the control circuit to the flasher apparatus. Fig. 2 will be used to explain flasher frequency and duty cycle as related to our invention.

Referring to the drawing, and particularly to Fig. 1, the apparatus may be generally described as comprising a flasher light 1, receiving high voltage from an autotransformer TR having primary winding 2 and secondary winding 3 connected to a power source or battery 7 and to a vibrator designated generally by numeral 8. Control of the flashing is by circuitry including switching transistors $T_1$ and $T_2$, a photo-electric cell 30 which automatically cuts off or turns on the flasher during daylight or nighttime respectively, all interconnected with fixed and variable resistances and with capacitors whose functions and purposes will appear as the invention is more fully described.

The flasher light 1 is a typical gas filled lamp having two electrodes. The spacing of the electrodes and the type of gas employed and the gas pressure in the tube determine the type of light output. Any type of lamp requiring high voltage and low current for ignition may be employed. The photocell 30 is preferably light-shielded from light 1. The flasher light is connected across the autotransformer at 4 and 5. The autotransformer secondary winding 3 has many more turns than the primary winding 2 and represents a step-up turns ratio, preferably of about 35:1, or greater. But the invention is not limited in that respect since the turns ratio of primary 2 to secondary 3 is determined by the type of flasher lamp 1 used. The center tap 6 of the autotransformer is connected to the positive terminal of the power source 7.

The vibrator 8 is a standard commercially available vibrator pack such, for example, as is commonly used in auto radios. One stationary arm 12 of the vibrator is connected at 4 to one side of the primary winding 2 of the autotransformer and the light 1. The moving arm 11 of the vibrator 8 is connected to the negative terminal of the power source 7. The second stationary arm 10 of the vibrator 8 is connected at 13 to one side of the actuating coil 9 of the vibrator 8. The other side of the actuating coil 9 is connected to the negative terminal of the power source.

The power source 7 can be any low impedance power source but for a portable unit must be a battery having a voltage suitable with the other circuit parameters and having current delivery capabilities compatible with economy and desired life of the power source. Six and twelve volt flash light batteries have been used satisfactorily, but the invention is not limited to such batteries or voltages.

The coil 9 of the vibrator 8 is connected to the control system at 13 and 13'. The control system is composed of a load resistor 14 which is connected to the collector 28 of a PNP switching transistor $T_1$. The emitter 27 of the switching transistor $T_1$ is connected to the negative terminal of power source 26 which in turn is connected to the positive terminal of power source 7. A forward bias resistor 25 is connected at 22 to a current limiting resistor 24 which in turn is connected to the base 29 of the switching transistor $T_1$.

The collector 21 of an NPN switching transistor $T_2$ is connected at 22 to the current limiting resistor 24 and the forward bias resistor 25. The emitter 20 of the switching transistor $T_2$ is connected to the negative terminal of the power source 7.

For the purpose of controlling the frequency of flashing as hereinafter more fully explained, a variable resistor 23 is connected between base 19 of the switching transistor $T_2$ and at 22 to one side of the current limiting resistor 24 and the forward bias resistor 25. One side of a condenser 17 is connected at 18 to the base 19 of the switching transistor $T_2$ and the frequency control resistor 23.

To the other side of condenser 17 is connected one side of a variable resistor 16 which is provided to afford "time-on" control for regulation of the duration of the flash. The other side of variable resistor 16 is connected at 15 to the junction of the load resistor 14 and the collector of the switching transistor $T_1$.

For the purpose of automatically cutting off during daylight and cutting in at nightfall, as hereinafter more fully explained, a photocell 30 is connected from the base 19 of switching transistor $T_2$ to the negative terminal of power source 31. The positive terminal of power source 31 is connected to the negative terminal of power source 7.

A capacitor 32 is connected from the base 19 of switching transistor $T_2$ to the negative terminal of power source 7; and a capacitor 33 is connected from terminal 12 of vibrator 8 to the negative terminal of power source 7; and a capacitor 34 is connected from terminal 10 of vibrator 8 to the negative terminal of power source 7, all for the purpose as will appear in connection with the following description of the operation.

Referring now to the operation of the circuit in Fig. 1, the circuit automatically becomes operative when the power source 7 is connected into the circuit. Prior to application of power to the circuit, the contacts 10, 11 and 12 of the vibrator 8 are not in contact with one another and are as pictured in Fig. 1. The instant power is applied to the circuit the following action takes place in the control portion of the circuit. Instantaneously, the supply voltage appears at junction 22 and the potential at junction 18 starts to rise to the supply voltage. As the base 19 of transistor $T_2$ becomes positive (this is the same potential as that which appears at junction 18), the transistor $T_2$ conducts and the base 19 is held at some potential slightly positive above the ground or B— i.e. negative of battery 7, to which the emitter 20 is connected. Meanwhile, the potential at junction 22 drops from the power supply voltage to some less positive voltage by the voltage drop across resistor 25 due to the collector current of transistor $T_2$. The less positive potential at junction 22 is applied to the base 29 of transistor $T_1$, causing transistor $T_1$ to conduct. Conduction of transistor $T_1$ caused by the fact that the full power supply potential is applied to the emitter 27 of transistor $T_1$, and a voltage less positive, by the potential drop across resistor 25, is applied to the base 29 of the transistor $T_1$, while the collector is at ground potential. The conductor of $T_2$ creates a negative bias on transistor $T_1$ and causes it to conduct. Base current is limited by resistor 24. As transistor $T_1$ conducts and draws current a positive potential appears at junction 15, which is the potential across the resistor 14 and coil 9 of vibrator 8. This potential is approximately the power supply potential less the small potential drop across the emitter-collector resistance of the transistor $T_1$. The current flow is limited by resistance 14 and resistance of coil 9. The potential at junction 15 is applied to capacitor 17 through variable resistor 16 and capacitor 17 attempts to charge through the emitter 20 and base 19 of transistor $T_2$ to the potential applied at junction 15. As capacitor 17 attempts to charge to the potential appearing at junction 15, it places the base 19 of transistor $T_2$ at a cut-off potential with respect to the emitter 20 thereby causing the transistor $T_2$ to cut off.

As transistor $T_2$ is cut off, the potential on the base 29 of transistor $T_1$ is increased thus causing transistor $T_1$ to stop conducting thereby removing the positive potential which existed at junction 15.

As soon as transistor $T_2$ is cut off and the potential of junction 15 no longer exists, capacitor 17 ceases to charge and attempts to discharge the accumulated potential through variable resistor 23, resistor 25, through the power source, through actuating coil 9 of the vibrator 8, through load resistor 14, and variable resistor 16. When capacitor 17 is completely discharged, initial circuit conditions are restored and one cycle is complete and another cycle starts.

When transistor $T_1$ conducts, current flows from the positive side of the battery through transistor $T_1$, resistor 14 and coil 9 to the negative side of the battery. Current flow through coil 9 sets the vibrator in action as follows:

Contact 11 is attracted toward contact 10 by the electromagnetic force of coil 11. When contacts 11 and 10 come together, they short out coil 9 and since no current flows through coil 9 the electromagnetic force which originally attracted contact 11 no longer exists and contact 11 is released. The sudden release of contact 11 causes it to swing over and make contact with contact 12. When contacts 11 and 12 are together, this completes the electrical circuit from the positive side of battery 7, through the primary winding 2 of transformer TR, and through the closed contacts 11 and 12 to the negative side of the battery. This completed circuit causes a high D.C. current to flow through the primary winding 2 of transformer TR. Contacts 11 and 12 remain together for a period of approximately 5 microseconds since there is no force keeping them together. Contact 11 rebounds after striking contact 12 and continues striking contact 10 and contact 12 repeatedly until it loses inertia and can no longer maintain its oscillations. When the high current flow is interrupted in the primary winding 2 of autotransformer TR, by breaking the electrical circuit through contacts 11 and 12, a counter E.M.F. is set up in the primary winding 2 of autotransformer TR. This high E.M.F. is induced into the secondary winding 3 of autotransformer TR. The large step-up turns ratio from primary winding 2 to secondary winding 3 causes a very high induced voltage into the secondary winding 3 of autotransformer TR. The induced voltage and the original back E.M.F. appearing across the primary winding 2 add together and are impressed across the electrodes of the gas filled lamp 1. The high voltage wave form which is impressed across the electrodes of the gas filled lamp 1 is illustrated in Fig. 3. Fig. 4 shows the voltage wave form appearing across the primary winding 2 and secondary winding 3 of autotransformer TR with no load applied.

Referring now to Fig. 4, the initial spike of voltage has an amplitude of 6–8 kv. with a time duration of 1300 micro-seconds. This spike of voltage is the one which ionizes the gas in the lamp 1 and causes it to break down and conduct.

Referring now to Fig. 3, the voltage wave form clearly indicates the loading effect that the gas filled lamp 1 has on the voltage spike shown in Fig. 4. For illustrative purposes, a typical high voltage neon gas filled lamp will ionize at a potential of 2500 volts. Therefore, when the initial voltage spike Fig. 4 is impressed across the gas filled lamp, the gas ionizes at 2500 volts, thereby breaking down and conducting. Conduction is maintained by the high voltage for a period of 1300 microseconds. As the voltage spikes diminish, the gas deionizes and again becomes a high impedance. When the gas is ionized, in the case of neon gas, it emits light in the visible light spectrum from 5800 angstroms to 1500 angstroms. Hence, if transistor $T_1$ is permitted to conduct continuously and actuate vibrator 8, the action of vibrator 8 will cause the primary circuit of the autotransformer TR primary winding 2 to be broken at a rate which corresponds to the frequency of the vibrator, e.g. 110 c.p.s. Each time the primary winding 2 circuit is broken, a high voltage Fig. 4 is induced across the gas filled lamp 1 causing it to ionize and conduct and emit light in the visible light spectrum. If the gas filled lamp is ionized at a frequency of 110 c.ps., the rate is so rapid that to the human eye the gas filled lamp 1 appears to be emitting light continuously.

Referring now to Fig. 1, capacitor 34 which shunts the coil 9 of vibrator 8 is used to shunt transient voltages to ground which are generated by the intermittent shorting of coil 9 of vibrator 8. The transient voltages are of a high frequency and if not bypassed to ground would interfere with the charge of capacitor 17, thereby causing an unstable charge characteristic resulting in unstable performance. Capacitor 34 places junction 13 at A.C. ground and permits the square wave of voltage previously described to be developed across resistor 14. Capacitor 34 acts also to suppress or prevent arcing between contacts 10 and 11 of vibrator 8, thereby reducing pitting of contacts.

Capacitor 33 located between the stationary contact 12 and movable contact 11 of vibrator 8 serves to bypass to ground radio frequencies produced by breaking the circuit which was completed with these contacts. Such bypassing avoids arcing between contacts 11 and 12; and pitting of those contacts 11 and 12 is reduced.

Referring now to Fig. 1, it can be observed that adjusting the variable resistor 16 will affect the charge time of capacitor 17 which in turn determines the length of time transistor $T_2$ and transistor $T_1$ will cause vibrator 8 to be actuated. This in turn results in a high voltage being generated which causes the high-voltage gas-filled lamp to conduct and emit light. Fig. 2 illustrates this time period for the charge of capacitor 17 as period A. The pulses B within this time period illustrates the time period that the primary 2 circuit is complete and current flows; and the time period C represents the frequency of the vibrator action. The time period D represents additional pulses which are generated as a result of the inertia of the vibrator 8 contact 11. This indicates that once energy is applied to the vibrator 8, the movable contact is set into oscillation (vibrator action) but when energy is removed contact 11 continues to make and break with contact 12 for a maximum of 10 cycles before it stops oscillating.

Thus, it becomes evident that energy need only be supplied for period A of the total on time period E. As the "on-time" period E varies, the energy used by the control circuit to maintain the light output will vary by some fraction of the total "on-time" E, but will always be smaller than that time by the time period D. This represents a saving inenergy consumption of the control circuit. The "off-time" period F is primarily controlled by the variable resistance 23 which controls the discharge time of capacitor 17. The higher resistance 23 is, the longer is the 'off-time" period F. Therefore, by maintaining control of the discharge time of capacitor 17, the frequency of the "on-time" E is controlled. This control can be adjusted to permit repetition rate or frequency from continuous light output ("off-time" period F equal to zero) to one cycle per minute ("off-time" period F equal to one minute). Slower rates are possible if so desired by selecting the value of resistor 23.

The function of power source 26 (usually a small battery, as for example a pen-light battery) is to limit the stand-by current of transistor $T_1$. This is accomplished as follows:

$T_1$ is a PNP type of transistor which requires that the emitter 27 be negative with respect to the base 29 in order to cut off conduction of transistor $T_1$. Without the benefit of power source 26, the emitter 27 of transistor $T_1$ will always be slightly more positive than its base 29 allowing some current to flow in the base circuit 29 even during off periods when transistor $T_2$ is cut off. This current flow represents a loss of power since it is not useful in producing light. Power source 26 is inserted in series with the emitter 27 of transistor $T_1$ in such a manner that the emitter 27 will be less positive with respect to its base 29, thereby diminishing the base current of transistors $T_1$ to a negligible value. This represents a condition of almost complete cut-off for transistor $T_1$. This bias voltage is overcome when $T_2$ conducts.

The function of photocell 30 and power source 31 is to prevent $T_2$ from functioning during daylight hours. By cutting off transistor $T_2$, the entire control unit circuit is deactivated and it is impossible for the light to flash. In operation, photocell 30 acts as a variable resistor whose resistance is a function of the amount of light striking the surface of the photocell 30. Photocell 30 is inserted in series with power source 31 whose polarity is such that it inserts a negative potential or bias between the base 19 and emitter 20 of transistor $T_2$. The amount of bias voltage will determine to what degree transistor $T_2$ will be cut off. The amount of bias voltage is controlled by the resistance of the photocell 30. The resistance of the photocell 30 is maximum when little or no light strikes it. Under these conditions, only a small bias voltage is applied to transistor $T_2$ which is insufficient to cut off the transistor. The resistance of photocell 30 is minimum when daylight strikes it. Under these conditions, a large bias voltage is applied to transistor $T_2$ which prevents it from conducting. Thus, when transistor $T_2$ is cut off, transistor $T_1$ has no signal to energize it and with the bias voltage 26, $T_1$ becomes effectively an open switch with no power drain on the circuit. Thus, an automatic cut off for the control circuit is provided, thereby permitting the battery to rest and recharge and thereby extending the life of the battery by at least a factor of two.

The range of control of photocell 30 can be controlled by either shading part of the photosensitive surface with a hood or shade (for longer daytime operation) or by shunting the photocell 30 with a resistor (for shorter daytime operation). Capacitor 32 is used to stabilize the circuit operation.

The control circuit with its advantages of manual frequency and duration control base-current limiting bias 26, and photoelectric cell as described can be readily used to light any incandescent light instead of the preferred gas-filled lamp, by making the following changes:

The gas-filled lamp 1 is removed, the transformer is removed, the vibrator 8 is removed and the load resistor 14 is replaced with the incandescent lamp and connected to the negative terminal of power source 7. All the advantages and features of the control circuit as described for the gas-filled lamp are applicable for the incandescent lamp circuit.

Other modifications within the scope of the invention will occur to those skilled in the art. Therefore, the invention is not limited to the specific embodiment disclosed.

What is claimed is:

1. In a system for flashing a light generator at a predetermined controlled rate, the combination of a source of low voltage power, a voltage step-up circuit between said source and the light generator and including a vibrating interrupter device having self-interrupting circuit means and a step-up transformer, energizing means including said source for operating said device, and a control circuit for said energizing means, the said control circuit comprising an inertialess cyclically operating electronic switching means separate from said vibrating interrupter device for connecting said power source to said energizing means, and circuit connections between said energizing means and said switch means to determine the duration of current flow from said source through said energizing means during each cycle of said switching means.

2. A system according to claim 1 in which the last mentioned circuit connections include an adjustable time rate circuit for causing current flow from said source through said energizing means during each switching cycle for a period of time less than the period of time said source is connected to said light generator.

3. In a system for flashing a light generator of the kind which requires a high voltage and at a predetermined controlled interrupted rate, the combination of a source of low voltage power, a voltage set-up circuit between said source and the light generator and including self-interrupting contacts with energizing means therefor, said energizing means being interruptedly connected to said source at the rate of connection of the said contacts for controlling said voltage step-up, a control circuit for said energizing means, said control circuit comprising transistor switching means for cyclically connecting said power source to said energizing means, and circuit connections between said energizing means and said transistor switching means to determine the duration of current flow from said source through said energizing means during each cycle of said switching means.

4. A system according to claim 3 in which the last mentioned circuit connections include timing means so that the duration of said current flow through said energizing means is only a fraction of the period that said contacts are controlling the said voltage step-up.

5. In a system for flashing a light generator of the kind which requires a high voltage, the combination of a source of low voltage direct current power, a converter for converting said low voltage power into high voltage alternating current power, said converter being of the kind having self-interrupting circuit contacts and energizing means for operating said contacts, a first transistor, a second transistor, circuit connections between said source and said transistors whereby one of said transistors is automatically triggered on and off at a predetermined rate and said first transistor automatically triggers the second transistor off and on at substantially the same rate, said energizing means being connected to said second transistor to be energized by the collector current from said second transistor, and other circuit connections between said energizing means and said first transistor for determining the current "on" period of the second transistor.

6. A system according to claim 5 in which the last mentioned circuit means includes a capacitor-resistance combination connected between said energizing means and the first transistor to apply a blocking potential to said first transistor.

7. A system according to claim 6 in which said capacitor-resistance combination applies said blocking potential to the first transistor to break the energizing circuit of said energizing means while allowing said self-interrupting contacts to continue to vibrate by inertia and thereby to continue the voltage step-up action after said blocking.

8. A system according to claim 7 in which a light responsive biasing control circuit is connected to the first transistor to control the connection of said source to said energizing means.

9. In a light flashing system for flashing a light generator at a predetermined accurately controlled rate, the combination of a source of low voltage direct current, an auto-transformer for supplying high voltage pulsating current to the light generator, a vibrating contact voltage converter having an energizing winding connected to said source and having interrupter contacts for connecting said source to the primary winding of said auto-transformer, a cyclically acting switch of the inertia-less electronic transistor kind, a circuit including said transistor switch for recurrently connecting said source conductively in series with said winding for a period "A," said contacts continuing to connect said source of said primary winding for an additional period "D" after said transistor switch and said series connection to said source is broken whereby said light generator receives lighting power while said transistor switch is not consuming power from said source.

10. A light flashing system according to claim 9 in which a voltage storing circuit is provided between said winding and said transistor switch for controlling the duration of each period that said series connection is closed.

11. In a system for flashing a gaseous discharge light generator at a predetermined accurately controlled rate, the combination of a step-up voltage transformer for supplying a high voltage pulsating current to said light generator, a source of low voltage direct current, a vibrating voltage converter comprising at least one stationary contact and a movable contact and an energizing winding for operating said movable contact, said movable contact being out of engagement with the stationary contact when said winding is de-energized, a circuit connecting said source in series with said energizing winding, cyclically operating switch means including a first transistor and a second transistor, circuit means connecting said source to both said transistors to cause the first transistor to become conductive and thereby to render the second transistor conductive and to pass current to said winding, other circuit connections including a condenser-resistance timing means between said winding and the first transistor and including said movable and stationary contacts to block both transistors against conduction after a predetermined number of vibrations of said movable contact while allowing said vibrations to continue by inertia to control said transformer step-up voltage after said transistors are blocked.

12. In a system for flashing a gaseous discharge lamp at a predetermined rate, the combination of a step-up auto-transformer for supplying high voltage current to said lamp, a source of low voltage direct current, a vibrator voltage converter having a movable contact and a pair of stationary contacts between which the movable contact vibrates, an energizing winding for operating said movable contact, said movable contact being out of engagement with both said stationary contacts when at rest, a first transistor, a second transistor, a circuit connecting said source in series with said second transistor and said winding independently of said movable contact, a circuit connecting said source in series with the primary winding of said transformer and including said movable contact and one of said stationary contacts, and additional circuit connections between a terminal of said source and said movable contact and including the other stationary contact to apply a blocking potential to the first transistor and thereby to terminate the current drain on said source from both of said transistors while allowing said converter to continue to control the application of the converted high voltage to said transformer.

13. A lamp flashing system comprising in combination, a first transistor, a second transistor, a source of lamp current, a circuit connecting said source in series with said second transistor and said lamp, said source also being connected to the first transistor, circuit connections between the two transistors to cause the first transistor to trigger the second transistor on, a voltage integrating circuit between said lamp and the first transistor to apply a blocking bias to the first transistor at regularly recurrent intervals and thereby to extinguish said lamp at corresponding intervals, and an additional biasing circuit for the first transistor including a light responsive device for rendering said second transistor ineffective to pass current to said lamp except when the light on said device is below a predetermined threshold level.

14. A light flashing system according to claim 13 in which said second transistor is provided with a source of auxiliary bias potential to completely block the second transistor in the periods when said blocking bias is applied to the first transistor.

References Cited in the file of this patent

UNITED STATES PATENTS

| | | |
|---|---|---|
| 2,071,958 | Watrous | Feb. 23, 1937 |
| 2,136,924 | Reitherman | Nov. 15, 1938 |
| 2,431,952 | Maxwell | Dec. 2, 1947 |
| 2,476,773 | Schreiber | July 1, 1949 |

UNITED STATES PATENT OFFICE
CERTIFICATE OF CORRECTION

Patent No. 2,918,607                                                             December 22, 1959

James Z. Peepas et al.

It is hereby certified that error appears in the printed specification of the above numbered patent requiring correction and that the said Letters Patent should read as corrected below.

Column 3, line 64, for "conductor of $T_2$" read -- conduction of $T_2$ --; column 4, line 61, for "anamplitude" read -- an amplitude --; line 68, for "atypical" read -- a typical --; column 5, line 59, for "inenergy" read -- in energy --; column 6, line 12, for "transistors $T_1$" read -- transistor $T_1$ --; column 7, line 3, for "switch means" read -- switching means --; line 16, for "set-up circuit" read -- step-up circuit --.

Signed and sealed this 31st day of May 1960.

(SEAL)
Attest:

KARL H. AXLINE                                              ROBERT C. WATSON
Attesting Officer                                           Commissioner of Patents